United States Patent
Keller

(10) Patent No.: US 7,739,827 B2
(45) Date of Patent: Jun. 22, 2010

(54) FISHING ROD HOLDER

(76) Inventor: Cyril N. Keller, 1802 Connell Dr., Fergus Falls, MN (US) 56537

( * ) Notice: Subject to any disclaimer, the term of this patent is extended or adjusted under 35 U.S.C. 154(b) by 0 days.

(21) Appl. No.: 11/627,729

(22) Filed: Jan. 26, 2007

(65) Prior Publication Data

US 2007/0169394 A1 Jul. 26, 2007

Related U.S. Application Data

(60) Provisional application No. 60/762,968, filed on Jan. 26, 2006.

(51) Int. Cl.
*A01K 97/12* (2006.01)
*A01K 97/10* (2006.01)

(52) U.S. Cl. .......................... 43/17; 43/21.2; 248/514; 248/534; 248/535

(58) Field of Classification Search ............... 43/17, 43/16, 15, 21.2; 248/534, 535, 538, 539, 248/514
See application file for complete search history.

(56) References Cited

U.S. PATENT DOCUMENTS

| | | | | |
|---|---|---|---|---|
| 443,286 A * | 12/1890 | Kunzel | | 43/16 |
| 449,202 A * | 3/1891 | Bushong | | 43/17 |
| 461,586 A * | 10/1891 | Matzenauer | | 43/17 |
| 467,120 A * | 1/1892 | Kunzel | | 43/17 |
| 467,121 A * | 1/1892 | Kunzel | | 43/17 |
| 467,122 A * | 1/1892 | Kunzel | | 43/17 |
| 467,123 A * | 1/1892 | Kunzel | | 43/17 |
| 476,940 A * | 6/1892 | Wiss | | 43/17 |
| 541,354 A * | 6/1895 | Hartmann | | 43/16 |
| 632,823 A * | 9/1899 | Perrin | | 43/17 |
| 834,414 A * | 10/1906 | Schmidt, Jr. | | 43/16 |
| 975,822 A * | 11/1910 | Becker | | 43/16 |
| 1,131,508 A * | 3/1915 | Hall | | 43/17 |
| 1,217,308 A * | 2/1917 | Holek | | 43/17 |
| 1,349,528 A * | 8/1920 | Owsiak | | 43/17 |
| 1,503,967 A * | 8/1924 | Subert et al. | | 43/17 |
| 1,516,484 A * | 11/1924 | Meszaros | | 43/17 |
| 1,729,646 A * | 10/1929 | McCurley | | 43/16 |
| 1,934,536 A * | 11/1933 | Hawkinson | | 43/17 |
| 1,996,704 A * | 4/1935 | Hawkinson | | 43/16 |

(Continued)

FOREIGN PATENT DOCUMENTS

DE 3308650 A1 * 9/1984

(Continued)

*Primary Examiner*—Darren W Ark
(74) *Attorney, Agent, or Firm*—Moore & Hansen, PLLP

(57) ABSTRACT

A holder for a rod and reel combination as may be used for ice fishing is disclosed. The holder has an elongated arm pivotally supported on a wall, pail or fixture mounting bracket for adjustable movement in a horizontal plane; and a tubular sleeve is pivotally attached to the arm for removably receiving and holding a rod and its reel in such an orientation that the rod points downwardly for selective positioning over an ice fishing hole. An alarm finger movable between a restrained or cocked position and a tripped position for actuating an audible alarm is attached to the arm. A fishing line engagement member is operatively associated with the alarm finger in such a way that when a fish strikes and pulls the line, the alarm finger is released from its cocked position and moves to its tripped position to actuate the alarm.

28 Claims, 4 Drawing Sheets

U.S. PATENT DOCUMENTS

| | | | | |
|---|---|---|---|---|
| 2,265,330 A * | 12/1941 | Waddle et al. | | 43/21.2 |
| 2,301,885 A * | 11/1942 | Lachr | | 43/21.2 |
| 2,317,445 A * | 4/1943 | Davidson et al. | | 43/21.2 |
| 2,393,090 A * | 1/1946 | Davidson | | 43/21.2 |
| 2,430,112 A * | 11/1947 | Hamre | | 43/21.2 |
| 2,448,752 A * | 9/1948 | Wagner | | 248/538 |
| 2,576,624 A * | 11/1951 | Miller | | 43/21.2 |
| 2,580,130 A * | 12/1951 | Rowdon | | 43/21.2 |
| 2,606,731 A * | 8/1952 | Harris | | 43/21.2 |
| 2,628,795 A * | 2/1953 | Diderrich | | 248/538 |
| 2,632,616 A * | 3/1953 | Heistand | | 248/514 |
| 2,642,690 A * | 6/1953 | Soenksen | | 43/15 |
| 2,642,692 A * | 6/1953 | Smith | | 43/17 |
| 2,654,176 A * | 10/1953 | Kachelski et al. | | 43/17 |
| 2,657,492 A * | 11/1953 | Skorr | | 43/15 |
| 2,682,127 A * | 6/1954 | Binder | | 43/21.2 |
| 2,693,045 A * | 11/1954 | John | | 43/16 |
| 2,693,660 A * | 11/1954 | Nebergall et al. | | 43/21.2 |
| 2,704,412 A * | 3/1955 | Davis | | 43/21.2 |
| 2,756,954 A * | 7/1956 | Whitlow | | 248/538 |
| 2,828,096 A * | 3/1958 | Laslo | | 43/21.2 |
| 2,840,330 A * | 6/1958 | Minton | | 248/515 |
| 2,890,847 A * | 6/1959 | Minton et al. | | 248/534 |
| 2,924,038 A * | 2/1960 | Dahlgren | | 43/16 |
| 2,939,662 A * | 6/1960 | Johnson | | 248/534 |
| 2,961,209 A * | 11/1960 | Willey | | 248/535 |
| 2,981,509 A * | 4/1961 | Messenger et al. | | 248/538 |
| 2,988,311 A * | 6/1961 | Bow | | 248/514 |
| 2,995,855 A * | 8/1961 | Bell | | 43/21.2 |
| 3,037,314 A * | 6/1962 | Hardy | | 43/17 |
| 3,246,865 A * | 4/1966 | Latimer | | 43/21.2 |
| 3,401,479 A * | 9/1968 | Keyes | | 43/16 |
| 3,444,643 A * | 5/1969 | Dobbs | | 43/17 |
| 3,564,753 A * | 2/1971 | Fravel | | 43/21.2 |
| 3,792,829 A * | 2/1974 | Fickett | | 43/21.2 |
| 3,802,652 A * | 4/1974 | Holton, Jr. | | 43/21.2 |
| 4,021,958 A * | 5/1977 | Snodie | | 43/17 |
| 4,097,017 A * | 6/1978 | Hazlitt | | 248/538 |
| 4,157,803 A * | 6/1979 | Mack | | 43/21.2 |
| 4,161,839 A * | 7/1979 | Ward | | 43/17 |
| 4,198,775 A * | 4/1980 | Leisner | | 43/21.2 |
| 4,270,724 A * | 6/1981 | McMullen | | 248/534 |
| 4,520,586 A * | 6/1985 | Moisan | | 43/17 |
| 4,522,572 A * | 6/1985 | Hahn | | 43/17 |
| 4,586,688 A * | 5/1986 | Hartman et al. | | 43/21.2 |
| 4,635,390 A * | 1/1987 | Walters | | 43/21.2 |
| 4,750,286 A * | 6/1988 | Gray | | 43/15 |
| 4,823,493 A * | 4/1989 | Gray | | 43/15 |
| 4,932,152 A * | 6/1990 | Barlotta et al. | | 43/21.2 |
| 5,052,146 A * | 10/1991 | Resnick | | 43/21.2 |
| 5,115,598 A * | 5/1992 | Shaw | | 43/21.2 |
| 5,249,387 A * | 10/1993 | Slocum et al. | | 43/17 |
| 5,269,088 A * | 12/1993 | Slaback et al. | | 43/17 |
| 5,345,708 A * | 9/1994 | Loyd | | 43/21.2 |
| 5,359,802 A * | 11/1994 | Gutierrez | | 43/16 |
| 5,437,122 A * | 8/1995 | Wilson | | 43/21.2 |
| 5,438,789 A * | 8/1995 | Emory | | 43/21.2 |
| 5,460,306 A * | 10/1995 | Rudd | | 43/21.2 |
| 5,571,228 A * | 11/1996 | McMurtrie | | 43/21.2 |
| 5,613,318 A * | 3/1997 | Hislop | | 43/16 |
| 5,697,183 A * | 12/1997 | Walker | | 43/21.2 |
| 5,890,312 A * | 4/1999 | Ball | | 43/16 |
| 5,903,998 A * | 5/1999 | Hawkins et al. | | 43/15 |
| 5,930,938 A * | 8/1999 | De Fraties et al. | | 43/15 |
| 5,987,801 A * | 11/1999 | Anderson | | 43/17 |
| 6,052,937 A * | 4/2000 | Morong | | 43/21.2 |
| 6,170,189 B1 * | 1/2001 | Klein | | 43/17 |
| 6,237,821 B1 * | 5/2001 | Owen | | 43/21.2 |
| 6,336,287 B1 * | 1/2002 | Lobato | | 43/16 |
| 6,421,948 B1 * | 7/2002 | Craig | | 43/17 |
| 6,446,379 B1 * | 9/2002 | James | | 43/17 |
| 6,539,662 B2 * | 4/2003 | Heath | | 43/15 |
| 7,047,688 B2 * | 5/2006 | Sandman, Jr. | | 43/21.2 |
| 7,210,263 B2 * | 5/2007 | Franke | | 43/21.2 |
| 7,219,464 B1 * | 5/2007 | Kujawa | | 43/21.2 |
| 7,257,922 B2 * | 8/2007 | Willard | | 43/21.2 |
| 7,322,148 B2 * | 1/2008 | Coulman | | 43/17 |
| 7,621,066 B1 * | 11/2009 | Mathison | | 43/21.2 |
| 2005/0204606 A1* | 9/2005 | Phillips | | 43/17 |
| 2006/0265934 A1* | 11/2006 | Morris | | 43/21.2 |
| 2008/0060251 A1* | 3/2008 | Morris | | 43/15 |
| 2009/0094878 A1* | 4/2009 | Dungan | | 43/15 |
| 2009/0241406 A1* | 10/2009 | Foss | | 43/21.2 |
| 2009/0272022 A1* | 11/2009 | Grega | | 43/17 |

FOREIGN PATENT DOCUMENTS

| | | | |
|---|---|---|---|
| GB | 2143412 A * | 2/1985 |
| GB | 2143711 A * | 2/1985 |
| GB | 2199721 A * | 7/1988 |
| JP | 10234282 A * | 9/1998 |
| JP | 2000342147 A * | 12/2000 |
| JP | 2004166680 A * | 6/2004 |
| JP | 2004313163 A * | 11/2004 |

* cited by examiner

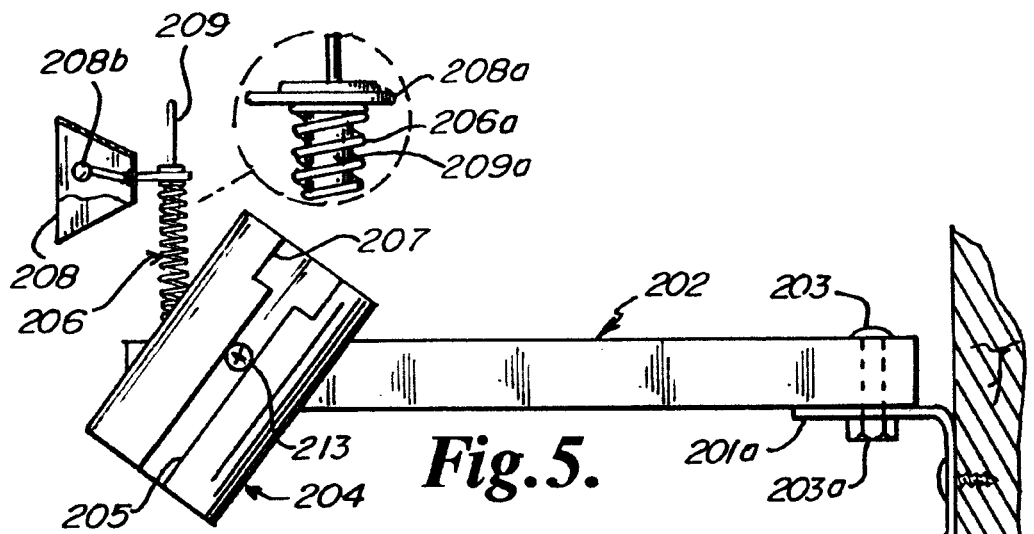
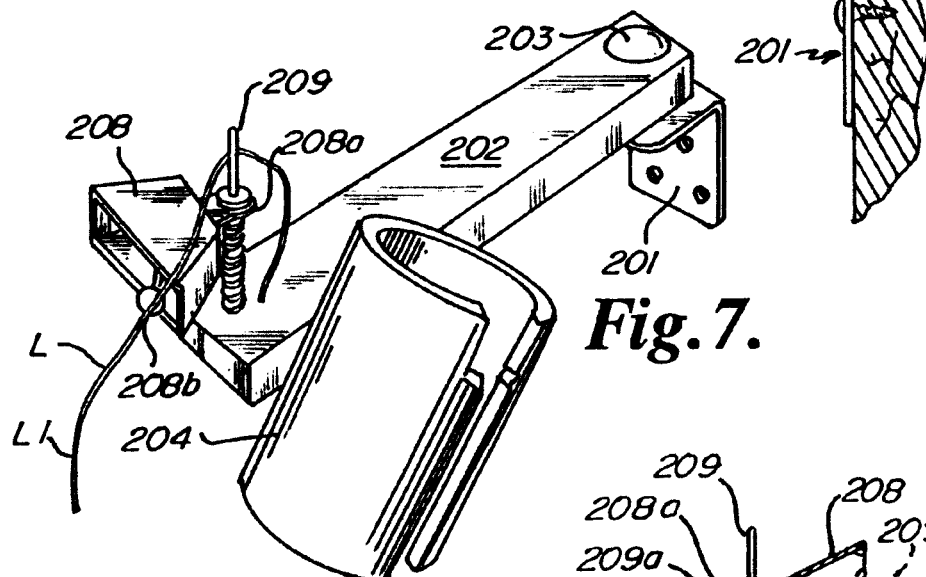
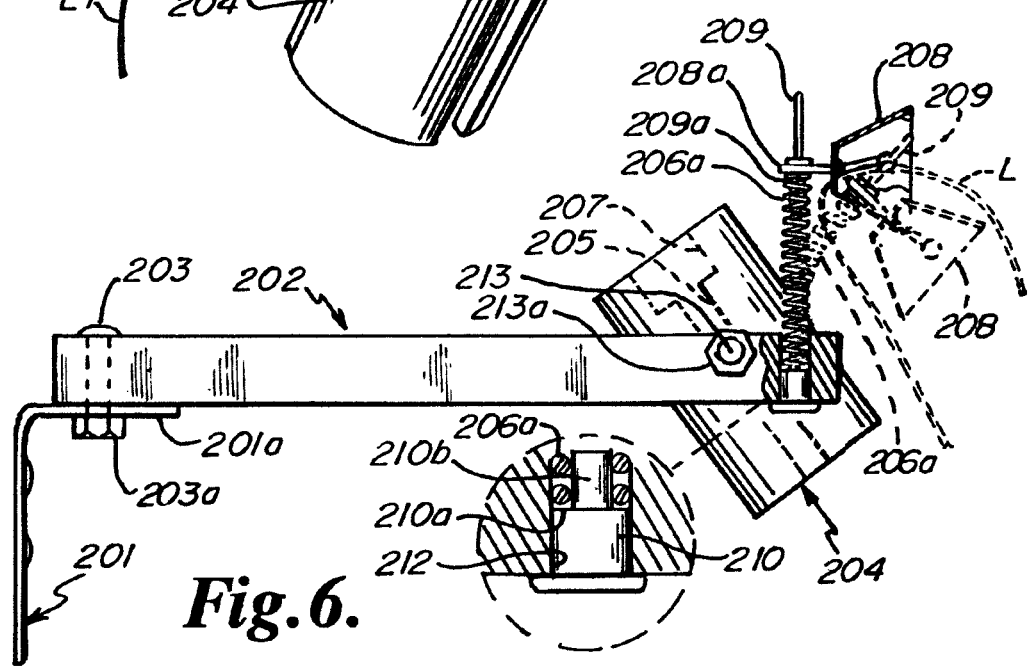
Fig. 5.
Fig. 7.
Fig. 6.

FISHING ROD HOLDER

RELATED APPLICATION

This application claims the benefit of priority from Application No. 60/762,968 filed on Jan. 26, 2006 as a Provisional Application and entitled FISHING ROD HOLDER.

FIELD OF THE INVENTION

This invention relates to a fishing rod holder, and in particular to a holder for removably supporting a fishing rod and reel assembly of the type commonly used for ice fishing. Such rods are normally of a short length compared to ordinary fishing rods so as to facilitate their use inside ice fishing houses and on the ice in close proximity to holes drilled through the ice.

BACKGROUND OF THE INVENTION

Wall mounted rattle reels are in common use in ice fishing houses. Such reels may be mounted on the inside wall of a fishing house in such a way that the line is dispensed straight down from the reel into a hole in the ice formed inside the house. These reels have a rattle built into the reel mechanism so that when a fish strikes, and the line plays out, a rattle is heard to alert the fishermen. The rattle reel suffers from the disadvantage that the line must be pulled in hand over hand in order to land the fish.

A product known as "ROD RATTLER" has also been introduced to the market place. That rod incorporates a rattle reel mounted on a bracket arm attached to a wall, with a separate bracket arm extending from the reel support arm for the attachment of an ice fishing rod. This arrangement suffers from several disadvantages. When a fish strikes, the entire reel support arm and bracket assembly for the rod must be removed from the wall mount, along with the rod and rattle reel, and that bracket and support arm assembly interferes with use of the rod and reel when trying to land a fish. Moreover, the simple, inexpensive rattle reels do not provide the drag setting mechanisms and precision operating features of ordinary fishing reels, which are very advantageous in playing large fish.

There is thus a need for a way of holding and securing an ordinary ice fishing rod and reel assembly within an ice house, while awaiting a fish strike, while also providing an alarm signal when a fish does strike so that the rod and reel can be readily dismounted from its holder in order to play and land the fish. The rod holder disclosed herein meets that need.

BRIEF SUMMARY OF THE INVENTION

The rod holder is constructed and arranged in such a way that an ordinary rod and reel assembly of the type normally used for ice fishing may be securely supported on the holder while awaiting a strike and quickly and easily disengaged from the holder to play a fish when a strike does occur. To that end, the holder is comprised of a swing arm which may be swingably or hingedly mounted to the inside wall of an icehouse or on a pail or other supporting member, and a tubular rod holding sleeve pivotally attached to the swing arm. The holder further comprises signal or alarm finger apparatus mounted on the swing arm in such a way as to releasably hold a fishing line and to provide an audible signal when a fish strikes. The tubular sleeve is slotted to facilitate quick and easy insertion and removal of the rod and reel assembly.

BRIEF DESCRIPTION OF THE DRAWINGS

The following detailed description of the invention is made with reference to the accompanying drawings, wherein like reference numerals have been used to identify like elements throughout the several views briefly described as follows:

FIG. 5 is a side elevation view of a different embodiment of the rod holder apparatus on which a line engaging member is directly incorporated on the alarm finger for releasably restraining the alarm finger;

FIG. 6 depicts in side elevation the rod holding apparatus of FIG. 5, from the opposite side;

FIG. 7 is a top, perspective view of the rod holding apparatus of FIGS. 5 and 6.

DETAILED DESCRIPTION

Figure 1:
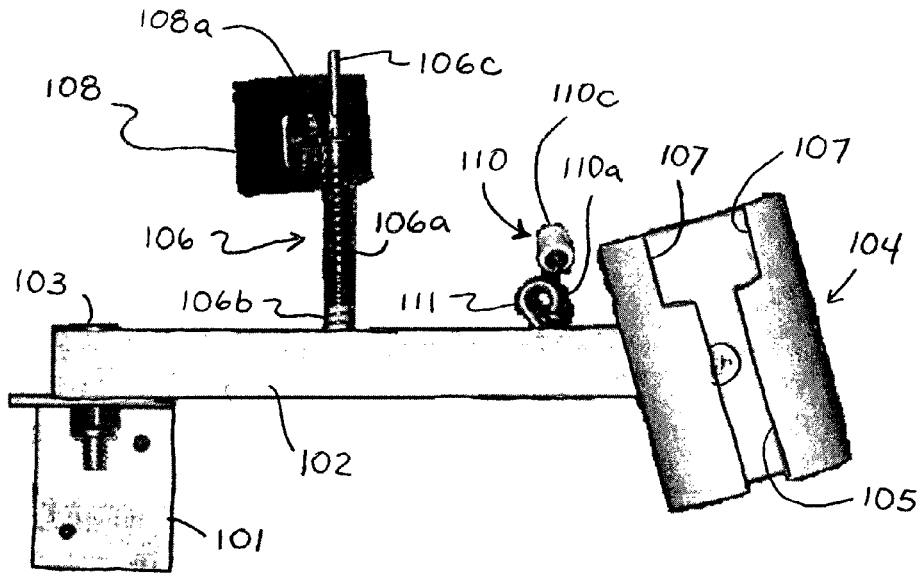
FIG. 1 is a side elevation view of one embodiment of the invention utilizing a detent device on a rod mounting swing arm to releasably restrain an alarm finger which is released when a fish strikes.

FIGS. 1-4 illustrate one embodiment of the rod holder apparatus on which a swing arm 102 is utilized for mounting a tubular rod holder sleeve 104.

Arm 102 may be rotatably mounted on the inside wall of an ice fishing house by utilizing a right angle bracket 101. A pivot bolt 103 is secured through the inner end of arm 102 into the top plate of the bracket 101 to permit arm 102 to be rotated horizontally. In this embodiment, sleeve 104 is provided with a slot 105 which is notched at 107 at its upper end to accommodate and retain a fishing rod and its reel. Notch 107 serves to retain the connecting stem between the reel and the rod in a rest position. Sleeve 104 may be utilized to accommodate right or left handed reel use. By detaching Sleeve 104 from its pivot bolt attachment to the outer end of arm 102 and mounting it on the opposite side arm 102, the change from right handed to left handed reel use may be accomplished.

Figure 2:
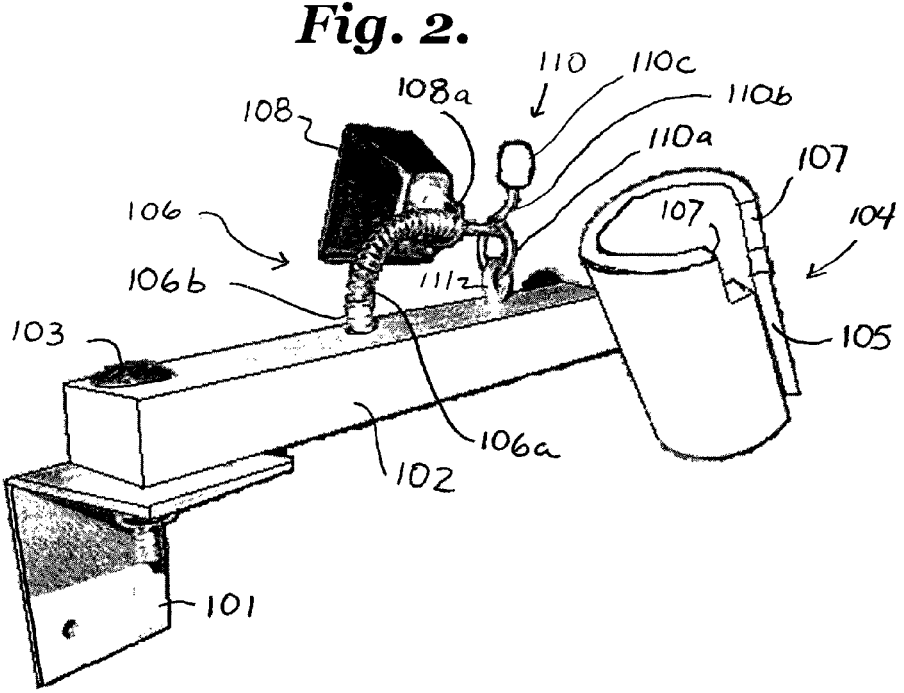
FIG. 2 is a perspective view of the rod holder of FIG. 1 showing the alarm finger restrained on the detent device in its restrained or cocked position.
Figure 3:
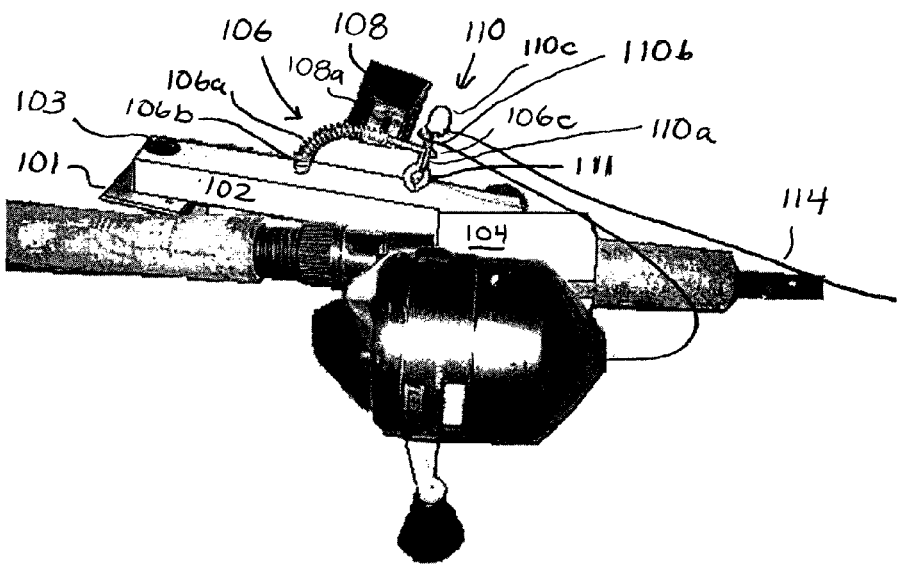
FIG. 3 is a perspective view of the rod holder of FIGS. 1 and 2 showing a fishing rod and reel removably supported on the rod holder.

The alarm finger is generally indicated by reference number 106 and advantageously comprises a coil spring 106a on a base stub or peg 106b attached to the upper surface of arm 102. A retention stem 106c is secured within the outer end of spring 106a at its enlarged base. Bell or alarm single device 108 carries an apertured tab 108a through which the base end of stem 106c extends in a fixed connection therewith. This provides a secure attachment of bell 108 to alarm finger 106. FIG. 1 shows the alarm finger 106 in its rest or released positioned. FIGS. 2 and 3 show the alarm finger 106 in its restrained or cocked position, releaseably engaged with a detent 110. Detent 110 is comprised of an oval detent ring 110a having an extension leg 110b to which a plastic cap 110c is attached at its outer end to assist in retaining a fishing line on leg 110b. Detent ring 110a is secured through a base attachment, which may comprise a screw eye 111 threaded into arm 102. Oval detent ring 110a is freely movable on base ring 111.

Figure 4:
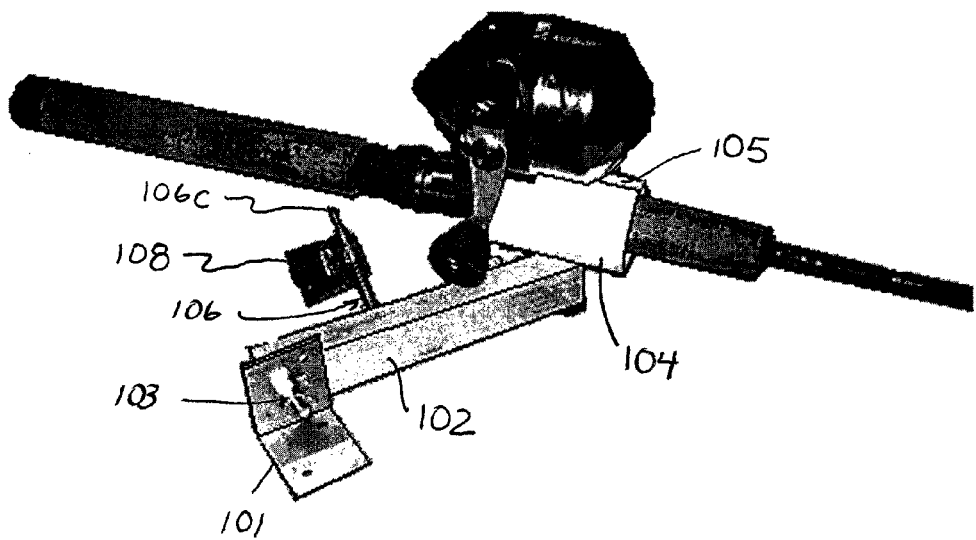
FIG. 4 is a perspective view of the rod holder and fishing rod combination of FIG. 3, from a bottom perspective.

FIG. 3 shows alarm finger 106 with its extension stem 106c engaged within detent 110a. With those parts still engaged, ring 110a will be held in a substantially upright position, with its extension leg 110b extending generally vertically. With a rod and reel assembly mounted on the rod holder as shown in FIG. 3, the line 114 extending from the fishing reel is looped around the backside of extension leg 110b, with the line extending through the eyes of the downwardly directed rod and downwardly through an ice fishing hole for attachment of a lure. When a fish strikes the bait or lure and a pulling force is applied to fishing line 114, it will be pulled forwardly against extension leg 110b. Leg 110b and detent ring 110a are thus moved forwardly with the result that stem 106c of alarm finger 106 is released, as shown in FIG. 4. Coil spring 106a then causes the entire alarm finger 106 to abruptly spring rearwardly, thus causing bell 108 to ring. The sounding of bell 108 alerts the fishermen that he has a strike on line 114. The rod and reel assembly may then be quickly removed from slotted holding sleeve 104 to permit the fishermen to play the fish with the rod and reel it in through the ice fishing hole, by simply raising the rod handle and sliding the rod itself through the slot 105 of sleeve 104.

Figure 8:
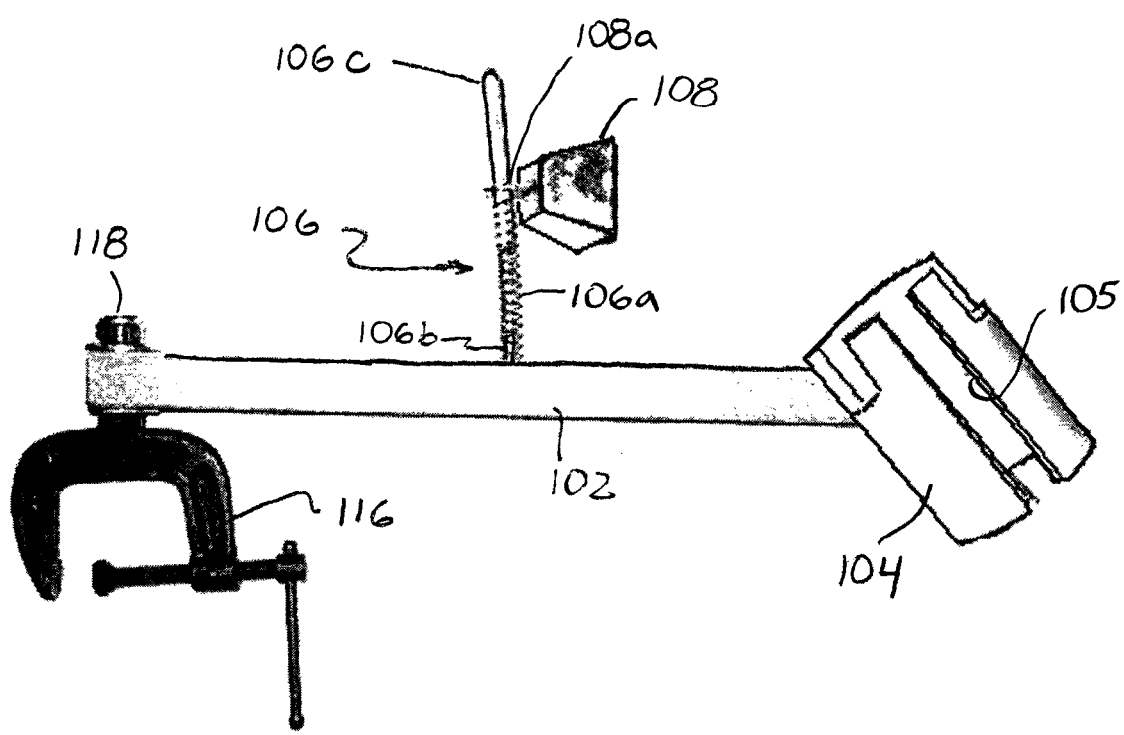
FIG. 8 is a side elevation view of an embodiment of the rod holder apparatus constructed for mounting on a fixture, such as a bucket or pail.

FIG. 8 illustrates a modified form of mounting device for the rod holder. Rather than mounting the holder on a wall for swinging movement to the desired position of use, a C-clamp 116 of standard construction may be utilized to secure swing arm 102, to any convenient supporting member, such as the rim of a large pail or an item of furniture. The inner end of arm 102 is swingably attached to C-clamp 116 by a pivot bolt 118.

FIGS. 5-7 illustrate a modified version of the rod holder apparatus, which also incorporates a swing arm 202 mounted for a swinging movement in a horizontal plane on a right angle bracket 201. Bracket 201 may be affixed to the wall of an ice fishing house as shown in FIG. 5. A pivot bolt 203 held in place by nut 203a passes through the inner end of arm 202 and is secured to horizontal segment 201a of bracket 201. A rod holding, tubular sleeve 204 slotted at 205 and having a top notch 207 as described above with respect to FIGS. 1-4 is attached by a pivot bolt 213 to arm 202, adjacent its outer end. Bolt 213 is held in place by nut 213a. In this way, sleeve 204 may be rotated to different angular positions after a rod and reel assembly is inserted therein, e.g., as shown in FIGS. 3 and 4, so as to position the rod tip directly over a fishing hole. The rod and reel holding sleeve 104 of FIGS. 1-4 is similarly mounted on arm 102 by a pivot bolt for rotational adjustment to different angular positions for the rod.

A movable alarm finger, generally indicated by reference numeral 206 and similar to the alarm finger 106 of FIGS. 1-4, is preferably attached near the outer end of swing arm 202, opposite mounting bracket 201. A vertically disposed spring 206a of alarm finger 206 is mounted in the generally upright, rest position of FIGS. 5 and 7 by frictional engagement over a mounting pin 210b projecting upwardly from an enlarged pin base 210, as shown most clearly in the exploded, fragmentary view of FIG. 6. Spring 206a rests at its bottom end on shoulder 210a of the mounting pin base 210. Base 210 is frictionally engaged within a through hole 212 formed through swing arm 202.

At its upper end, spring 206a carries a fishing line retention stem 209 having an enlarged base end 209a extending downwardly into a friction fit with coil spring 206a. An alarm bell 208 having a bell clapper 208b as shown in FIG. 5 carries a horizontally extending, apertured tab 208a through which the base end 209a of stem 209 extends. Tab 208a rests on top of spring 206a and is secured thereto, as most clearly shown in the enlarged, fragmentary view of FIG. 5.

With a fishing rod and reel assembly inserted into sleeve holder 204 as disclosed with respect to FIGS. 3 and 4, and the rod directed downwardly, the line "L" may be pulled off the front side of the reel and wrapped around upright stem 209 as shown in FIG. 7. The end "L-1" of the line as shown in FIG. 7 will extend back down through the eyes of the fishing rod, and from the tip of the rod downwardly into the ice fishing hole when the rod is properly positioned by the adjustable, swinging movement of arm 202 over a fishing hole.

When the rod and its line "L" are thus properly positioned for fishing, the weight of the lure or bait on the line will be sufficient to pull spring 206a forwardly to its restrained or cocked position as shown in phantom lines in FIG. 6. When a fish strikes the bait or lure, the downward force on the line will pull the line "L" off the top end of stem 209, thus releasing the alarm finger 206 and causing it to spring upwardly and rearwardly. This happens in a quick, abrupt motion, with the movement and vibration of spring 206a causing bell 208 to ring and alert the fisherman that he has a bite. The rod and reel assembly may then be quickly removed from sleeve holder 204 to play the fish and reel it in.

As shown, the swing arm 202 is made of wood, and the rod/reel holding sleeve 204 is formed from plastic. However, various materials, including metal, may be utilized for those components.

It will be understood by those skilled in the art that various modifications may be made in the construction and arrangement of the component parts of the rod holder apparatus as disclosed herein, without departing from the spirit and scope of the invention as defined by the following claims:

I claim:

1. An apparatus suitable for supporting a fishing rod and reel above a frozen surface of water having an ice fishing hole, the apparatus removably attachable to an elevated portion of a transportable support member, the apparatus comprising:

an elongated arm having an inner end, an outer end, a top, a bottom and a side, with the inner end of the elongated arm removably mountable to the elevated portion of the transportable support member so that the bottom is spaced above the frozen surface of water;

a holder connected adjacent to the side of the elongated arm and adjacent the outer end thereof, the holder having an elongated fishing rod support portion, a first end, a second end and a longitudinal axis, wherein the fishing rod support portion receives and substantially encircles a segment of an elongated fishing rod as the fishing rod is initially brought into substantial alignment with the longitudinal axis of the holder and then moved towards the longitudinal axis of the holder from a direction that is substantially transverse to the longitudinal axis until the fishing rod segment contacts an inner surface of the fishing rod support portion and portions of the fishing rod extend beyond the first and second ends of the fishing rod support portion;

an alarm finger having a first end and a second end that define a length therebetween, with the first end fixedly attached to the elongated arm adjacent the holder, and with the second end operably biased for movement from a first position to a second position;

an audible alarm device operatively connected to and movable with the alarm finger, the audible alarm device actuated by movement of the alarm finger as said alarm finger moves between the first and second positions; and a fishing line engagement member, with the fishing line engagement member having a first end and a second end that define a second length therebetween that is less than the length of the alarm finger, the fishing line engagement member fixedly connected to the alarm finger so that the fishing line engagement member is in substantial linear alignment with the alarm finger when the alarm finger is in the second position, the fishing line engagement member configured to be able to initiate movement of the alarm finger to the first position in reaction to a first pulling force on a line of a reel supported on a rod supported by the holder in response to a fish strike, the engagement member operatively associated with the alarm finger so as to be able to initiate movement of the alarm finger to the second position in reaction to a second, greater pulling force on the line, whereby the audible alarm device will sound when a fish strikes.

2. The apparatus of claim 1, wherein the holder is a sleeve.

3. The apparatus of claim 2, wherein the holder includes a longitudinal slot extending an entire length thereof from the first end to the second end.

4. The apparatus of claim 3, wherein first and second ends of the longitudinal slot have different widths.

5. The apparatus of claim 1, wherein the fishing line engagement member is a substantially cylindrically shaped stem.

6. The apparatus of claim 1, wherein the line of the reel supported on the rod that is supported by the rod holder operatively contacts the engagement member.

7. The apparatus of claim 1, wherein the holder is oriented so that it is coincident with a substantially vertical plane, and wherein the holder is movably adjustable relative to the elongated arm.

8. The apparatus of claim 1, wherein the inner end of the elongated arm includes an aperture that extends from the top to the bottom, wherein the aperture is configured to receive a vertically oriented bolt that is operatively connected to the elevated portion of the transportable support member, with the bolt supporting and positioning the elongated arm above the frozen surface of water.

9. The apparatus of claim 1, wherein the alarm finger comprises a spring element.

10. A holder for supporting a rod and reel for ice fishing, the holder removably attachable to an elevated portion of a support member, the holder comprising:

an elongated arm comprising a body having an inner end, an outer end, a top, a bottom, a first side and a second side, with the inner end of the elongated arm removably mountable to the elevated portion of the support member;

a tubular, rod receiving sleeve pivotally mounted at the first side of the body and near the outer end thereof, with the rod receiving sleeve configured to support a rod and reel adjacent the first side of the body, and with the rod receiving sleeve positionable so that a first portion of the rod receiving sleeve extends vertically above the top of the body and a second portion of the rod receiving sleeve extends vertically below the bottom of the body when the elongated arm is mounted to the elevated portion of the support member;

a generally vertically oriented alarm finger having a first end and a second end that define a length therebetween, with the first end attached to the body and with the second end movable between a first position for detecting a strike of a fish, and a second, tripped position;

an audible alarm device positioned to be actuated by movement of the alarm finger between the first and second positions; and a fishing line engagement member, with the fishing line engagement member having a first end and a second end that define a second length therebetween, with the second length being less than the length of the alarm finger, with the first end of the fishing line engagement member fixedly connected to the alarm finger and with the second end of the fishing line engagement member configured so as to be able to actuate the movement of the alarm finger from the first position to the second position upon an initiation of a pulling force on a fishing line of the rod and reel supported by the rod receiving sleeve when the fishing line is engaged with the fishing line engagement member, whereby the audible alarm device will sound when a fish strikes.

11. The holder of claim 10, wherein the tubular, rod receiving sleeve comprises a longitudinal slot extending along an entire length thereof, with the slot configured to admit passage of a portion of the rod as the rod is moved in a generally transverse direction relative to the tubular rod receiving sleeve.

12. The holder of claim 11, wherein one end of the longitudinal slot includes a widened section.

13. The holder of claim 10, wherein the tubular, rod receiving sleeve supports a rod and reel such that a tip of the rod is lower than a handle of the rod.

14. The holder of claim 10, further comprising a mounting bracket that is removably attachable to the elevated portion of the support member, wherein the arm is swingably attached to the mounting bracket near the inner end thereof for adjustable, swinging movement in a horizontal plane.

15. The holder of claim 14, wherein the rod receiving sleeve is mounted to the first side of the body for pivotal movement in a vertical plane.

16. The holder of claim 14, wherein the alarm finger is attached to the body adjacent to the outer end of the arm.

17. The holder of claim 10, wherein the alarm finger comprises a spring element having a free end at said second end of said alarm finger, and wherein the free end of the spring element carries the audible alarm device.

18. The holder of claim 17, wherein the fishing line engagement member comprises a stem member connected to the free end of the spring element so that the stem member is generally vertically oriented with respect to the spring element when the spring element is in the second, tripped position, whereby a fishing line dispensed from a reel of a rod and reel assembly removably supported by the rod receiving sleeve can be engaged around the stem member to move the alarm finger to the first position where it is held by the weight of the lure on the fishing line until a fish strikes and pulls the line off of the stem member for release of the alarm finger to the second, tripped position.

19. The holder of claim 17, wherein the audible alarm device comprises a bell that is removably attached to the free end of the coil spring element.

20. The holder of claim 17, wherein the spring element is a coil spring.

21. The holder of claim 10, wherein the audible alarm device comprises a bell carried on the alarm finger.

22. The holder of claim 21, wherein the bell is removably secured to the alarm finger by an attachment tab.

23. The holder of claim 10, wherein the tubular, rod receiving sleeve only engages a forwardly facing surface of an attachment stem of a reel attached to a rod, and a portion of a rod handle that extends between the attachment stem of the reel and a tip of the rod.

24. The holder of claim 10, wherein the tubular, rod receiving sleeve does not engage a hand grip portion of a fishing rod handle that is located to a rear of a reel attached thereto.

25. The holder of claim 10, wherein the tubular, rod receiving sleeve is adjustably positionable relative to the arm.

26. The holder of claim 10, wherein the fishing line engagement member comprises a substantially linear stem having said second length which is a predetermined length, and wherein the stem has a consistent cross-sectional area along said predetermined length.

27. A holder, attachable to an elevated portion of a transportable support member, the holder suitable for use in supporting a fishing rod and reel for ice fishing, the holder comprising:

an elongated arm having an inner end, an outer end, a top, a bottom, a first side and a second side, with the inner end of the arm constructed and arranged to be removably mounted to the elevated portion of the transportable support member;

a rod receiving sleeve having a fishing rod support portion with first and second ends and a longitudinal slot extending an entire length thereof from the first end to the second end, the sleeve pivotally mounted to the first side of the arm adjacent the outer end of the elongated arm, with the rod receiving sleeve positionable so that the first end extends above the top and so that the second end extends below the bottom;

an alarm finger having a first end and a second end, with the first and second ends defining a length therebetween, with the first end attached to the elongated arm adjacent the rod receiving sleeve, and with the second end of the alarm finger movably biased from a first position that is generally horizontally oriented to a second position that is generally vertically oriented;

an audible alarm device attached to the second end of the alarm finger and movable therewith as the second end of the alarm finger moves between the first and second positions, the audible alarm device actuated by the alarm finger as said alarm finger moves between the first and second positions; and a fishing line engagement member, with the fishing line engagement member having a first end and a second end that define a second length therebetween that is less than the length of the alarm finger, the fishing line engagement member fixedly connected to the alarm finger and movable therewith, the engagement member configured to slidingly contact a line of a reel supported on a rod that is positioned in the rod receiving sleeve, wherein a small force exerted by a fish on the line exerts a downward force on the engagement member and will cause the alarm finger to be moved towards the first position, and wherein a larger force exerted by a fish on the line will cause the line to slidingly disengage from the engagement member so that the alarm finger moves towards the second position, thereby actuating the audible alarm device.

28. The holder of claim 27, wherein the longitudinal slot has a first width at the first end of the rod receiving sleeve, and a second width at the second end of the rod receiving sleeve, and wherein the first width is different than the second width.

\* \* \* \* \*